United States Patent [19]
Wellman et al.

[11] Patent Number: 5,687,081
[45] Date of Patent: Nov. 11, 1997

[54] LIFT TRUCK CONTROL SYSTEM

[75] Inventors: Timothy A. Wellman; John C. Wilkinson, Jr., both of Coldwater; Nicholas D. Thobe, Celina; Ned E. Dammeyer, New Bremen; Mark E. Schumacher, Lima, all of Ohio

[73] Assignee: Crown Equipment Corporation, New Bremen, Ohio

[21] Appl. No.: 366,610

[22] Filed: Dec. 30, 1994

[51] Int. Cl.$^6$ .................................. G06F 165/00
[52] U.S. Cl. ............... 364/424.07; 364/423.098; 395/427
[58] Field of Search ............... 364/423.098, 424.034, 364/424.04, 443, 424.07, 550, 551.01; 340/438, 439; 395/427; 371/15.1, 19, 21.1

[56] References Cited

U.S. PATENT DOCUMENTS

| | | |
|---|---|---|
| 3,819,922 | 6/1974 | Horn et al. . |
| 4,265,337 | 5/1981 | Danmeyer . |
| 4,368,824 | 1/1983 | Thomasson . |
| 4,376,298 | 3/1983 | Sokol et al. . |
| 4,477,874 | 10/1984 | Ikuta et al. . |
| 4,597,058 | 6/1986 | Izumi et al. . |
| 4,623,976 | 11/1986 | Carp et al. . |
| 4,642,775 | 2/1987 | Cline et al. ............... 364/443 |
| 4,655,039 | 4/1987 | McCabe et al. . |
| 4,677,555 | 6/1987 | Goyet . |
| 4,715,012 | 12/1987 | Mueller, Jr. . |
| 4,888,798 | 12/1989 | Earnest . |
| 4,899,299 | 2/1990 | MacPhail . |
| 4,941,174 | 7/1990 | Ingham . |
| 4,942,529 | 7/1990 | Avitan et al. . |
| 4,943,756 | 7/1990 | Carley, III et al. . |
| 4,949,263 | 8/1990 | Jurca . |
| 4,969,082 | 11/1990 | Oho et al. . |
| 4,969,104 | 11/1990 | Suzuki et al. . |
| 4,972,470 | 11/1990 | Farago . |
| 4,979,113 | 12/1990 | Roberts et al. . |
| 4,993,507 | 2/1991 | Ohkura . |
| 4,994,973 | 2/1991 | MaKino et al. . |
| 5,011,363 | 4/1991 | Carley, III et al. . |
| 5,012,414 | 4/1991 | Ishii et al. . |
| 5,019,799 | 5/1991 | Oshiage et al. ............... 340/438 |
| 5,022,496 | 6/1991 | Klopfleisch et al. . |
| 5,023,790 | 6/1991 | Luke, Jr. . |
| 5,039,924 | 8/1991 | Avitan . |
| 5,044,472 | 9/1991 | Danmyer et al. . |
| 5,047,944 | 9/1991 | Ishikawa et al. . |
| 5,050,080 | 9/1991 | Abe . |
| 5,058,016 | 10/1991 | Davidovitch . |
| 5,065,320 | 11/1991 | Hayashi et al. . |
| 5,068,790 | 11/1991 | Wellman . |
| 5,070,283 | 12/1991 | Avitan . |
| 5,075,853 | 12/1991 | Luke, Jr. . |
| 5,093,862 | 3/1992 | Scwartz . |

(List continued on next page.)

*Primary Examiner*—Gary Chin
*Attorney, Agent, or Firm*—Thompson Hine & Flory LLP

[57] ABSTRACT

A lift truck control system which utilizes a distributed control network including at least a display module, a distribution module, a traction module, a brake module and a steering module. The display and steering modules each are configurable by software which controls the module and the various drivers in each module. In the preferred embodiment, the display module includes flash memory which stores application software and can be rewritten so that the performance characteristics of the modules are software configurable. The display module is connectable to a programmable cartridge which includes nonvolatile flash memory that carries application software for the display and steering modules. When connected, the cartridge downloads the particular application software which is written over the stored software in flash memory for the display and steering modules. The programmable cartridge also can be used to store and download boot software to the display and steering modules, so that the boot procedure performed by the display and steering modules is also software configurable. The system accepts modules which can be installed in a variety of different lift truck vehicles with minimal physical changes; the performance of the modules is configured by the application software written into the flash memory of the module.

24 Claims, 10 Drawing Sheets

U.S. PATENT DOCUMENTS

| | | |
|---|---|---|
| 5,103,226 | 4/1992 | Danmeyer et al. |
| 5,107,425 | 4/1992 | Darges et al. |
| 5,113,344 | 5/1992 | Kellog et al. |
| 5,122,995 | 6/1992 | Vulleamier . |
| 5,163,001 | 11/1992 | Luke, Jr. |
| 5,189,617 | 2/1993 | Shiraishi . |
| 5,196,728 | 3/1993 | Jaux . |
| 5,202,832 | 4/1993 | Lisy . |
| 5,208,753 | 5/1993 | Acoff . |
| 5,218,542 | 6/1993 | Endo et al. |
| 5,278,759 | 1/1994 | Berra et al. ........................ 364/424.01 |
| 5,453,939 | 9/1995 | Hoffman et al. ........................ 340/438 |
| 5,491,631 | 2/1996 | Shirane et al. ........................... 340/438 |

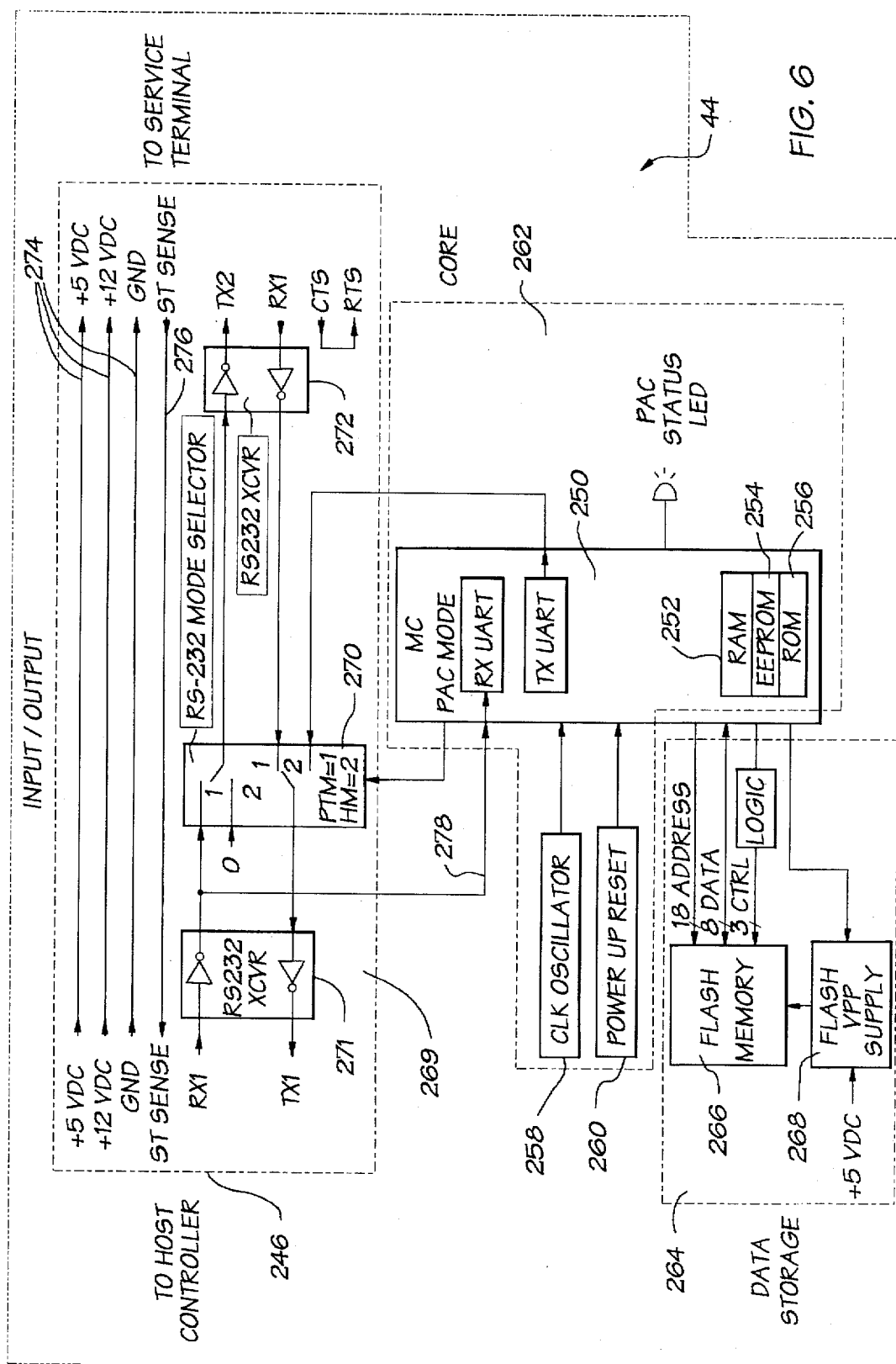

LIFT TRUCK CONTROL SYSTEM

BACKGROUND OF THE INVENTION

The present invention relates to control systems for material handling vehicles and, more particularly, to software configurable distributed control network systems for material handling vehicles.

In order to improve the performance and handling characteristics of vehicles, including material handling vehicles, it is desirable to provide an onboard system which modifies the performance of vehicle components in response to external conditions. For example, it may be desirable to vary the maximum turning angle of the vehicle steer wheel inversely with respect to the vehicle speed. Further, systems have been developed to provide sensing and operator display of such conditions as battery discharge, traction motor brush wear and the need for scheduled maintenance.

An example of such a system is disclosed in Avitan et al. U.S. Pat. No. 4,942,529. That patent discloses a lift truck having a control system which includes a microprocessor that receives logic signals corresponding to such parameters as the inclination of the associated lift truck, and "end-of-aisle" location and angle of steering wheel orientation. The microprocessor also provides digital output signals to control such components as traction motor contactors. The system disclosed in the Avitan et al. patent is design to enter a "learn mode" during which a technician or operator is instructed, through a series of commands appearing on the display panel of the lift truck, to provide certain inputs to the microprocessor, such as placing the vehicle in a straight ahead steered wheel value, and placing the travel controller in the full forward position.

The truck type is communicated to the microprocessor by setting an array of DIP switches to correspond to a particular vehicle type. The learn mode disclosed in the Avitan et al. patent is designed ostensibly to compensate for variations in response of system components, both initially and over time. However, there is no mechanism in the Avitan et al. patent for modifying the application program driving the microprocessor. Further, there is no readily available mechanism for modifying the learn program or the boot program inherent in the microprocessor of Avitan et al.

Further, it is known to provide a material handling vehicle with a microcontroller or module which includes a microprocessor and read only memory (ROM) that contains a complete library of application software for an entire fleet of vehicles. The microprocessor and the controller determines which set of application software to load into random access memory (RAM) by reading an identification tag which is physically associated with the lift truck. Such a system is disclosed in Kellogg et al. U.S. Pat. No. 5,113,344.

Accordingly, the controller mechanism of the Kellogg et al. patent is "universally" operative for every vehicle whose performance characteristics are contained in ROM. Again, however, in order to change the application software or modify the boot software of the microcontroller, it would be necessary to physically remove the ROM and replace it with ROM containing new instructions, or by replacing a card containing the ROM chip in the microcontroller.

Accordingly, there is a need for a system for controlling material handling vehicle in which the components of the lift truck are controlled by modules whose application software can be reconfigured without physical change of components. Further, there is a need for a material handling vehicle control system in which boot software and diagnostics can be conducted without modification of physical components.

SUMMARY OF THE INVENTION

The present invention is a control system particularly adapted for a material handling vehicle, such as a lift truck, having control modules which are software configurable and can receive software from a removable, programmable cartridge. Consequently, the hardware component of the control system of the present invention can be mounted on a wide range of material handling vehicles, then configured with boot and application software appropriate for the specific vehicle model and associated accessories. Once installed on the material handling vehicle, the control system can be reconfigured as needs change, or to suit a particular operating environment, such as operation in a warehouse having a relatively low ceiling, or to accommodate a buried cable guidance system.

In the preferred embodiment, the control system is in a form of a distributed control network, also known as a Controller Area Network or CAN, and includes a display module and an operation module, such as a steering module, which are interconnected by a data bus. An advantage of this modularization is that the steering module can be mounted on the base or power unit of the vehicle, and the display module may be mounted on a cab which is supported on the lifting masts of the vehicle, so that control cables extending along the mast are minimized.

In the preferred embodiment, the display and steering modules each include a core having a microprocessor, network interface, boot ROM, RAM, EEPROM and a programmable logic device for controlling the network interface and RAM. The modules also include a plurality of drivers which, in the case of the display module, actuate various indicator lights on the display panel, such as steering wheel orientation, battery discharge and maintenance interval. In the case of the steering module, the drivers actuate relays for applying brakes, steering motor, and stop lift. The steering module can receive input from other, non-programmable modules, such as a traction control module and monitor switch inputs and diagnostic status. Both modules also include a general input/output driver array which, in case of the display module, actuates an alarm and receives input from a display-mounted toggle switches, and in the case of the steering module actuates the steer motor and receives feedback from the steering encoder for the vehicle.

The display module differs from the steering module in that it also includes a memory functional-block that has flash memory for storing application software for the display module itself and the steering module. In addition, flash memory stores updated instructions for boot programs stored in ROM on the modules.

When the system is activated, both the display and steering modules execute a primitive boot program in which the memory functional block verifies the presence of the module display and steering modules, determines whether the display and steering modules are appropriate for the associated vehicle, and if so, proceeds to load flex boot software from flash memory in the memory block to RAM and to the other modules on the CAN. The flex boot initiates communications between modules, downloads flex boot instructions to all modules, and loads application software to RAM in the modules.

The entire system is software configurable. The memory functional block, which in the preferred embodiment is part of the display module, includes a communication port which receives a programmable cartridge. The cartridge includes a microprocessor and memory for storing application software for the modules, as well as data identifying the particular model or models of vehicle for which such application software is appropriate. The cartridge can be configured electronically to a pass through mode, in which it serves to interconnect the display module with a service terminal. The service terminal can be used to run diagnostics and the like.

In a host mode of operation, the software cartridge is attached to the display module during the primitive and flex boot-up procedures. The boot software in the display and steering modules includes instructions which operate the microprocessors of those modules to interrogate the cartridge to receive additional or modified boot instructions. Consequently, the boot procedure can be modified on a one-time-only basis by connecting the software cartridge during the boot procedure. Alternatively, the cartridge can download modified boot instructions, or different application software for the modules to the flash memory in the memory functional block.

Accordingly, it is an object of the present invention to provide a control system for a material handling vehicle which is completely software configurable; a control system in which the boot and application software for the control modules can be modified or replaced by attachment of a software cartridge; a control system in which the boot procedure can be modified permanently, or modified on a one-time-only basis; a control system which is adaptable to a wide range of vehicle types; a control system which includes software safeguards to prevent improper installation of boot and application software on a particular vehicle; and a control system which is rugged, can interface with non-configurable control modules and is cost effective to implement.

Other objects and advantages will be apparent from the following description, the accompanying drawings and the appended claims.

BRIEF DESCRIPTION OF THE DRAWINGS

FIG. 6 is schematic of the software cartridge of the system of FIG. 2;

DETAILED DESCRIPTION

Figure 1:
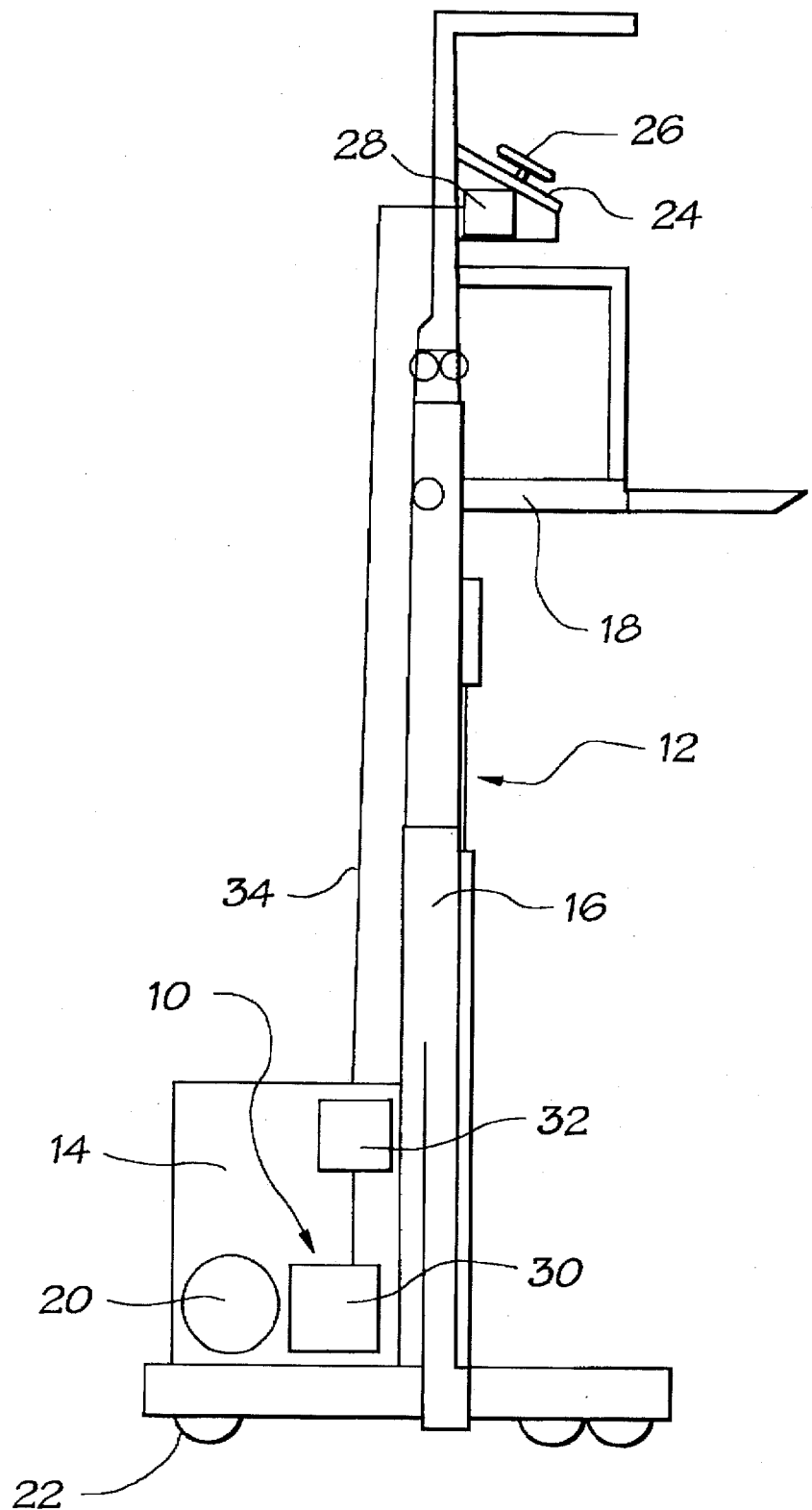
FIG. 1 is a schematic side elevation of a material handling vehicle incorporating the control system of the present invention.

As shown in FIG. 1, the control system of the present invention, generally designated 10, is adapted to be mounted on a material handling vehicle such as a lift truck 12 of the "order picker" type having a power unit 14, telescoping mast 16 and operator platform 18. The power unit 14 includes a steer motor 20 which powers a pivotal drive-steer wheel 22. The operator platform 18 includes a display panel 24 and steering tiller 26.

Modules and Network

Figure 2:
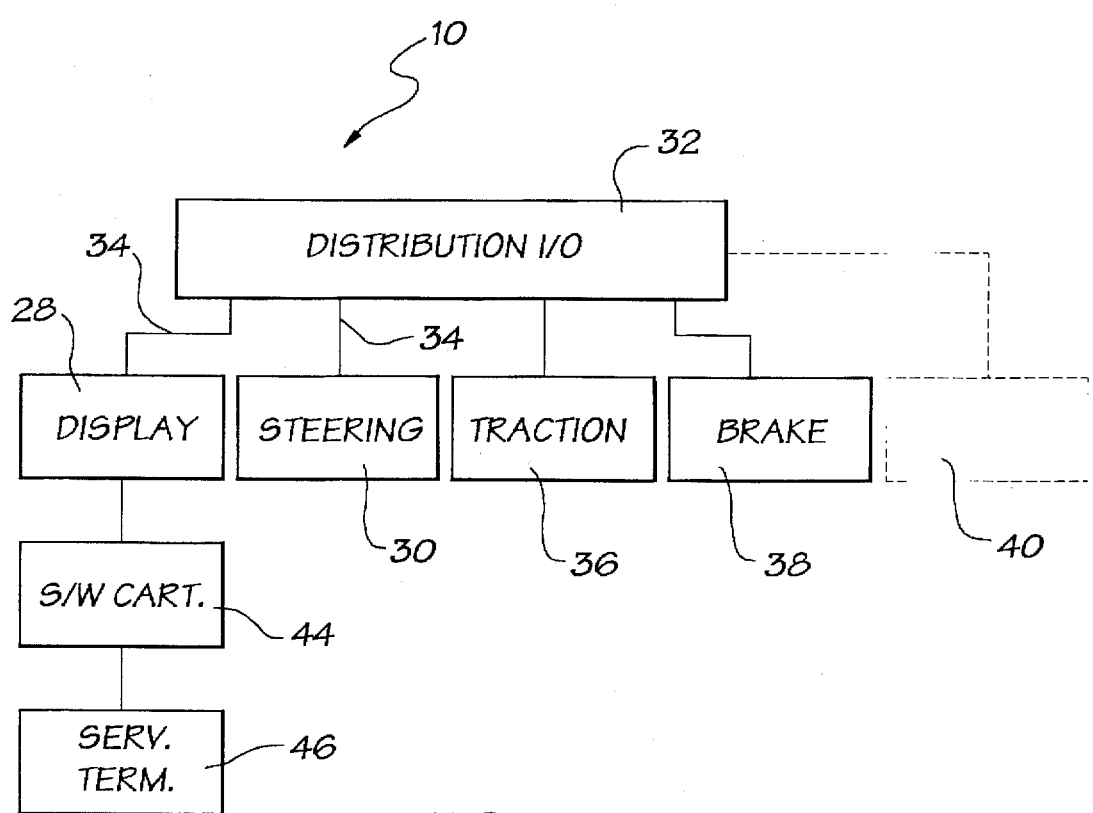
FIG. 2 is a schematic representation of a preferred embodiment of the control system of the present invention, mounted in the vehicle of FIG. 1.

As shown in FIGS. 1 and 2, the control system 10 includes a display module 28 and steering module 30. The display and steering modules 28, 30, as will be explained below, each are software configurable and are interconnected by a distribution-input/output module 32 across a communications network 34, also known as a Controller Area Network ("CAN"). The communication network conforms to the standard ISO-11898:1993(E) Road Vehicles-Interchange of Digital Information-Controller Area Network (CAN) for high speed communication. The network 34 allows messages to be sent and received from modules on the network. These messages may be software updates, and operational and fault information. The network is given a high-speed transfer of time critical messages, transfer calibration, diagnostic and system configuration data, minimizes electromagnetic interference, and in relatively low cost.

In addition to the display and steering modules 28, 30, the control system 10 includes non-configurable modules such as the traction module 36 and brake module 38. The system 10 is expandable to include additional modules 40, which may or may not be software configurable, or on network 34. The modules 28 and 30 communicate and share data with each other through the network 34, with the distribution module 32 interconnecting these modules with each other and, as shown in FIG. 3, with input devices and the non-network traction module 36.

Figure 3:
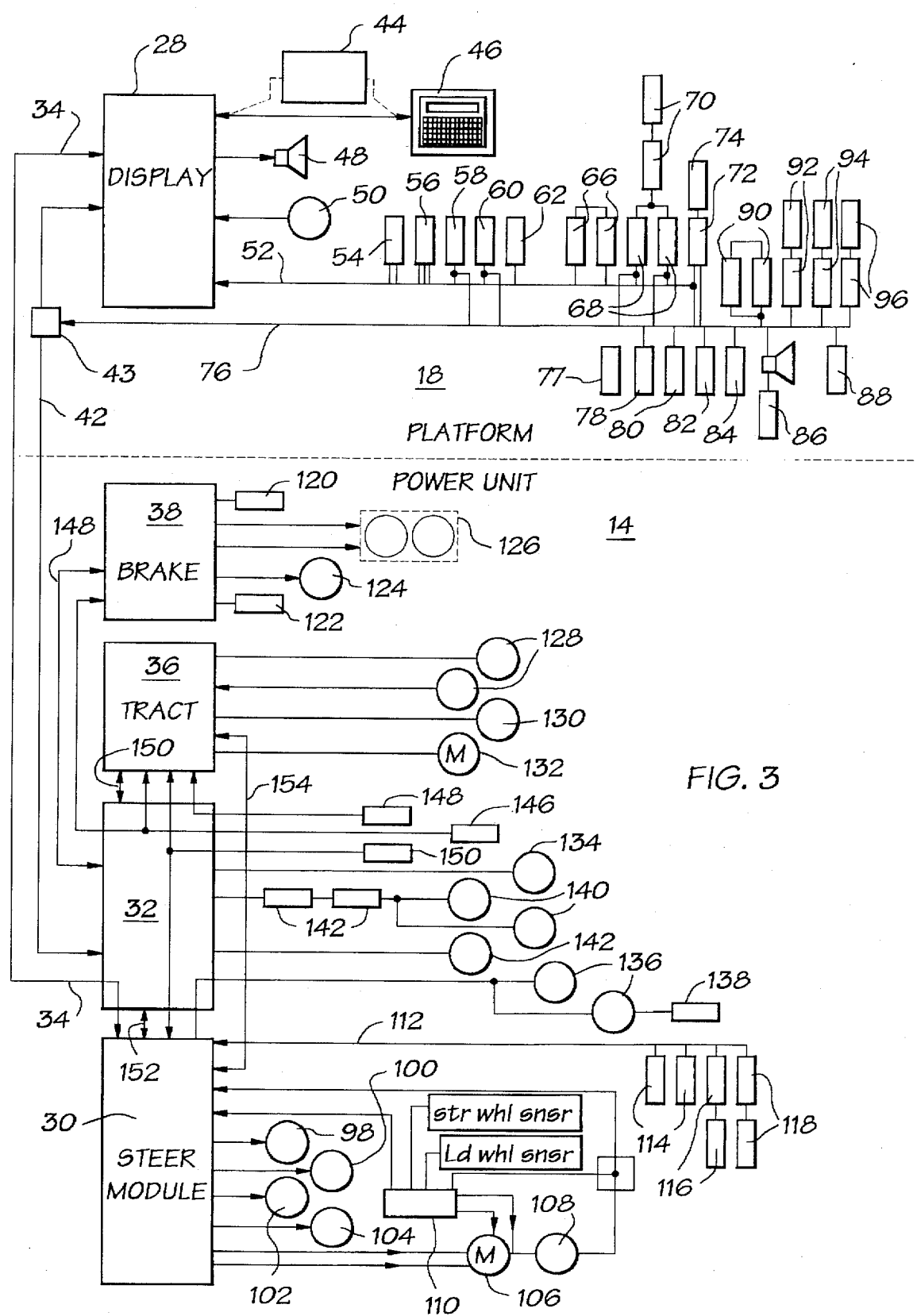
FIG. 3 is a schematic of the preferred embodiment of the system of FIG. 2, showing the distribution of components on the vehicle of FIG. 1.

As shown in FIG. 3, the control system 10 is mounted on the lift truck 12 (see FIG. 1) such that the display module 28 is mounted in the operator platform 18 within the display panel 24, while the distribution module 32 and associated brake, traction and steering modules 38, 36, 30, respectively, are mounted within the power unit 14. Consequently, information is conveyed through the communication network cable 34 along the mast 16 of the lift truck 12. In a preferred embodiment, there also exists a control wiring harness 42 which runs from the platform terminal block 43 in the operator platform 18 along the mast 16 to the distribution module 32 in the power unit 14. Consequently the number of control and data cables extending along the mast 16 is kept to a minimum.

As shown in FIG. 3, the display module includes an RS 232 port which receives a software cartridge 44 (see FIG. 6 and related description below) for downloading software and boot instructions to the display and steering modules, and also connects to a service terminal 46, which is used to perform diagnostics. A typical service terminal 46 is the TRANSTERM 5, manufactured by Computerwise, Inc., of Olathe, Kans. The display module 28 also includes a status alarm 48 and a steering tiller encoder sensor 50, connected to the steering tiller 26 (see FIG. 1). A control bus 52 connects the display module 28 to display mode select switch 54, lift cut out zone select switch 56, low speed lower switch 58, low speed raise switch 60, guidance switch 62, lower cut out and override switches 66, forward and reverse switches 68, gate switches 70, key switch 72 and emergency disconnect switch 74.

Cable 76 feeds into control wiring cable 42 and includes thermal switch 77 high speed raise switch 78, brake switch 80, 24" height switch 82, 60" height switch 84, horn and horn switch 86, traction accelerator sensor 88, lower cutout switches 90, gate switches 92, high speed lower switch and high speed lower switch cutouts 94 and chain brake switches 96.

On power unit 14, steering module 30 is connected to actuate brake relay 98, steer motor relay 100, stop lift relay 102, guidance relay 104, power steering motor 106, wheel position feedback encoder 108, and a guidance module 110 which takes control of motor 106 and enables the vehicle 12 (see FIG. 1) to follow a buried cable. Bus 112 connects the steering module 30 with raise cutout switches 114, rail guide switches 116 and battery restraint switches 118.

Brake module 38 receives inputs from thermal switch 120 and drive/tow switch 122. Brake module 38 actuates brake relay 124 and vehicle brake 126. Traction module 36 actuates forward and reverse contactors 128, MOSFET bypass contactor 130 and actuates traction motor 132. Distribution module 32 actuates emergency disconnect 134, lift pump contactors 136 and high speed raise cutout switch 138, high speed raise and lower solenoid valves 140, which are in series with chain brake switches 142, and power up relay 142. Distribution module 32 connects with 120" height switch 146 with traction and brake modules 36, 38, 150" height switch 148 with traction module 36 and 180" height switch 150 with traction and steering modules 36, 30, respectively. The distribution module also communicates with brake module 38 through data and control cable 148, traction module 36 through data and communication module 150 and steering module 30 through data and control cable 152. Steering module 30 also is directly connected to traction module 36 through RS 232 control cable 154, and therefore can be programmed to control the functions of the traction module, as will be explained in greater detail with reference to FIG. 5.

Figure 4:
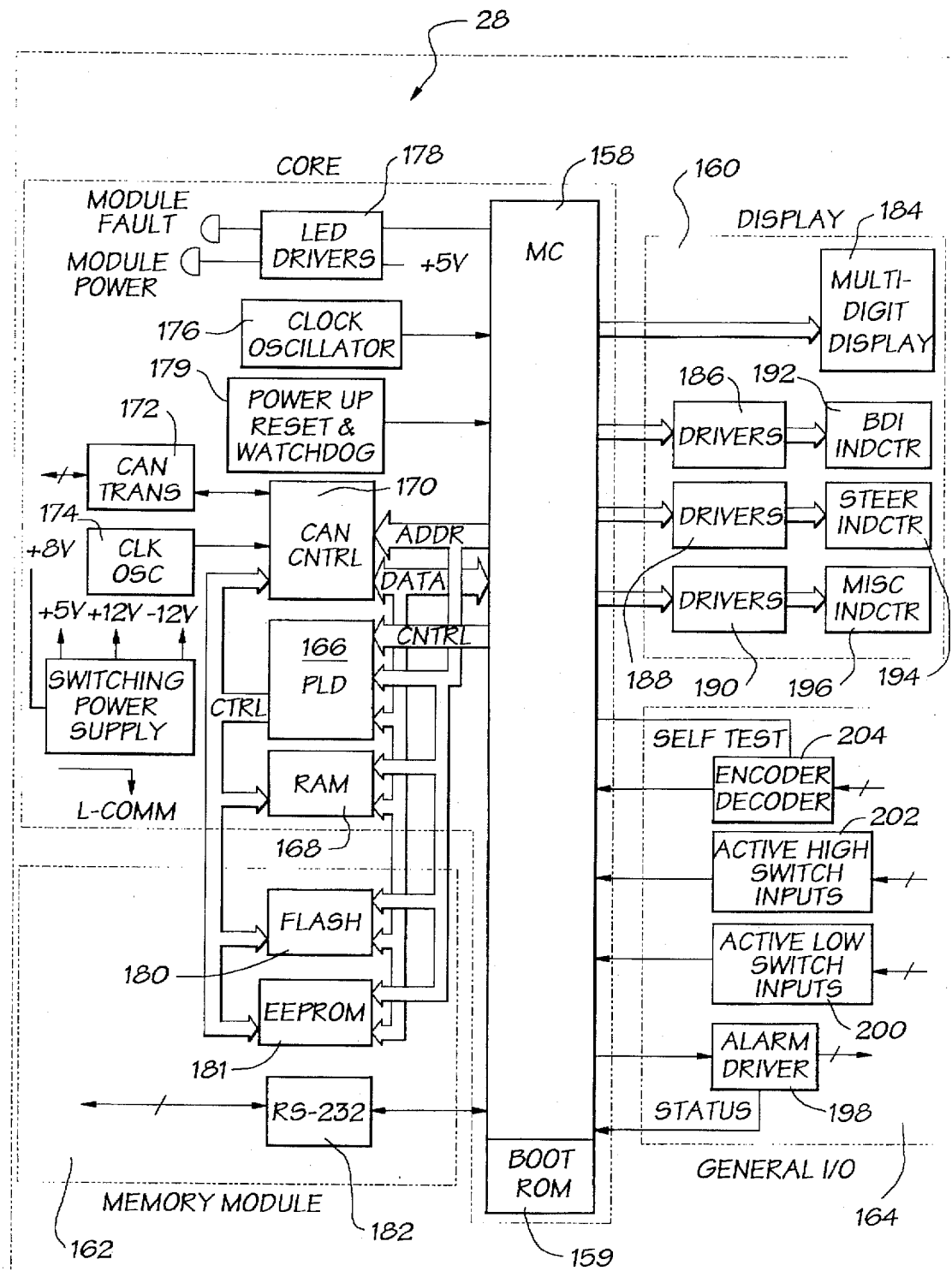
FIG. 4 is a schematic representation of the display and memory modules of the system of FIG. 2.

As shown in FIG. 4, the display module 28 includes a core functional block 156 having a microcontroller or microprocessor 158. A preferred microprocessor 158 is the Motorola Model 68HC11E9. The microprocessor 158 drives a display functional block 160, a memory module functional block 162 and is connected to a general input/output functional block 164. The microprocessor 158 controls a programmable logic device ("PLD") 166 which decodes the address map so that data being stored or retrieved by the microcontroller 158 will come from or go to the proper location. PLD 166 also ensures proper chip enable, read and write strobes for timing, and decodes the encoder count and direction. PLD 166 controls RAM 168 and a controller 170 for the CAN network 34. A preferred PLD is a Cypress CY7C542 or an Altera EP5128. The network controller 170 is connected to a data link interface or transceiver 172 which, in turn, is connected to the remainder of the network 34. The controller 170 is regulated by a clock oscillator 174 operating at 16 MHz. A separate clock oscillator 176 regulates activity within the microprocessor 158, and operates at 8 MHz. In the preferred embodiment, the core 156 includes indicator light 178 to indicate a fault condition. Reset circuitry 179 monitors the operating voltage of the microprocessor 158 and provides a reset condition wherever this condition is out of normal operating voltage range of 4.75V to 5.5V.

The memory module functional block 162 includes flash memory 180, which is controlled by programmable logic device 166 and receives data from microprocessor 158. Memory module functional block 162 also includes EEPROM 181, which is also controlled by programmable logic device 166 and receives data from microprocessor 158. An RS232 connector port 182 comprises part of the memory module functional block and communicates directly with microprocessor 158. Port 182 is capable of operation at 1200 to 9600 baud.

Display functional block 160 includes a multi-digit text window display 184 which is controlled by microprocessor 158, and displays such information as error messages, truck conditions, and special modes of operation. The display block 160 also includes drivers 186, 188, 190 which, respectively, drive a nine element LED bar graph battery discharge indicator 192, a five element LED steering position indicator 194, and a miscellaneous display 196 for such items as an icon indicating that maintenance is required, or that the vehicle 12 is traveling in a lift cutout zone.

The general input/output functional block 164 includes an alarm driver output 198 (which drives driver warning alarm 48, see FIG. 3) and switch inputs for interfacing with operator controls and monitoring devices. Specifically, the microprocessor 158 receives information from eight active low switch inputs 200 and eight active high switch inputs 202. Input 204 receives signals from steering tiller encoder 50 (see FIG. 3) indicating the orientation of the steering wheel 26 (see FIG. 1). Microprocessor 158 includes a boot ROM segment 159. The core functional block 156 includes a power supply 205 which receives power from the vehicle battery (not shown) and powers the display module 28, the encoder sensor 50, the service terminal 46 and the cartridge 44 (see FIG. 3) which is preprogrammed to load a flex boot program from flash memory 266 to RAM 168 on the display module 28 and to RAM 214 on the steering module 30 over network 34. The software in ROM 159 will be executed immediately upon power up.

Figure 5:
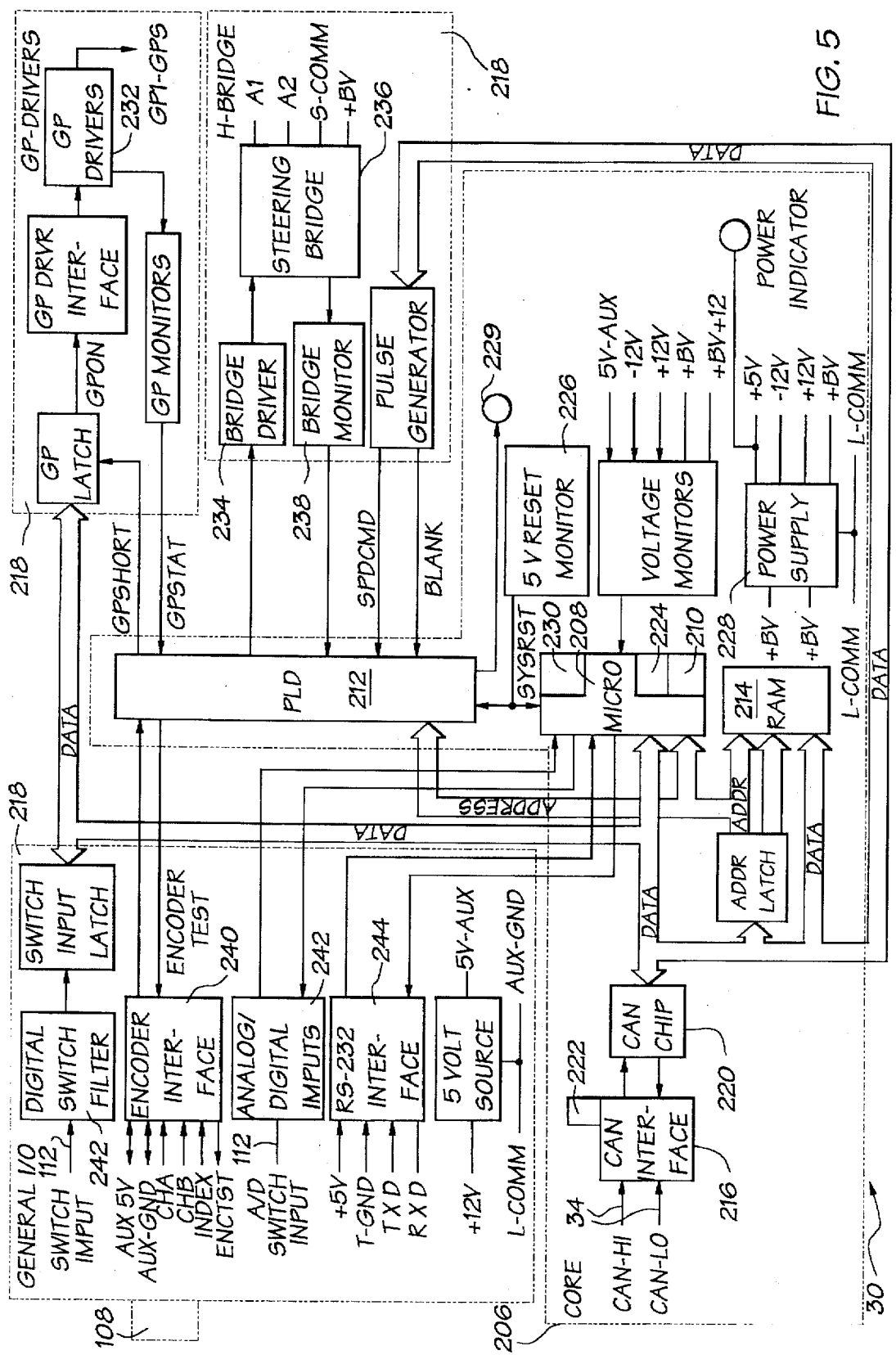
FIG. 5 is a schematic representation of the steering module of the system of FIG. 2.

As shown in FIG. 5, the steering module 30 is connected to receive steering commands over the communication network 34 and provide current to the DC steer motor 106 (see FIG. 3) to position the steer wheel 22 (see FIG. 1) of the lift truck 12. While in the preferred embodiment this is the primary function of the steering module 30, the module is sufficiently flexible and adaptable to handle other functions as well. The steering module 30 includes a core functional block 206 which is shown in FIG. 5B. Core 206 includes a microcontroller or microprocessor 208, preferably a Motorola Model 68HC11E9, having a boot ROM 210 with code identical to the code in ROM 159, which is preprogrammed to load a flex boot program from the CAN 34 (FIG. 4) to RAM 214.

The microprocessor 208 operates a programmable logic device ("PLD") 212 which in turn controls operating RAM 214 and the communications network 216. PLD 212 also controls the general input/output functional block 218, which will be discussed in greater detail below. The network controller 216 communicates with a transceiver 220 that is connected to the network 34. The controller 216 includes a clock oscillator 222 which regulates the operation of the network controller 216. Microcontroller 208 includes clock oscillator 224 which regulates its operation. The core functional block 206 also includes reset circuitry 226 and a power supply 228 similar to the reset circuitry 179 and power supply 205 of the display module 28. The microprocessor 208 drives LED drivers 229 which actuate LED lights to indicate a fault condition and power.

The power supply 228 is selected to operate in 24 to 48 volt battery systems, and generates the appropriate voltage levels for the various logic circuits on the module 30. The power up and reset circuitry 226 monitors the operating voltage of the microprocessor and provides a reset condition whenever this voltage is out of normal operating voltage range. Further, this circuitry provides a power up delay to hold the microprocessor 208 to wait in reset for oscillator stabilization whenever the voltage has dropped below normal operating range (5 volts). The microprocessor 208 also has an on-board COP reset which is enabled by the circuitry 226 to provide a reset whenever the COP timer is not serviced in a sufficient time. This power up and reset circuitry and COP reset are also present in the core functional block 206. The programmable logic device 212 also controls EEPROM memory 230, which in the preferred embodiment is internal to the microprocessor 208.

The general input/output functional block 218 interfaces with the core functional block 206 and includes 6 general purpose drivers 232 (only one driver 232 being shown in FIG. 5). The output drivers 232 are used for the control for relays and direct control of actuators, solenoids and motors, such as relays 98, 100, 102, 104, shown in FIG. 3. The block 218 also includes an H-bridge configuration output driver 234 of N-channel metal oxide semiconductor field effect transistors. The bridge driver 234, in combination with the core functional block 206, converts direction information received from the network interface 220 into H-bridge commands to the bridge 236 to control steer motor 106 (see FIG. 3). A bridge monitor 238 is provided which monitors the function of the H-bridge motor and transmits data back to the core functional block 206.

The input/output block 218 includes a quad decoder 240 which is connected to the steering encoder 108 (see also FIG. 3) and includes 3 lines for phase A, phase B and index signals with respect to supply common. The steering module decoder 240 decodes the signals from the encoder 108 to indicate the direction of the rotation of the steer wheel 22 (FIG. 1). For example, a clockwise rotation of the wheel 22 is indicated by the phase A signal leading the phase B signal. Conversely, if the phase B leads the phase A signal, a counterclockwise rotation is indicated. In addition, an index pulse is used to indicate the beginning or termination of a complete revolution of the encoder 108. The channels A and B are in a four times quadature decode setup for direction with an index line for absolute position. For example, a full turn of a 256 encoder will provide 1,024 counts.

A low pass filter network 242 filters signals from switches 114, 116, 118 (see FIG. 3) which enter through bus 112. An RS-232 serial communication port 244 is connected to provide access to the microprocessor 208 within the core functional block 206.

As shown in FIG. 3, data flows to and from traction module 36 across RS 232 cable 154 to port 244. This allows the steering module 30 to send and receive data from the traction module 36 across the CAN 34 to the display module 28. For example, the display module 28 can download data to the traction module 36 during calibration, such as setting acceleration and deceleration rates, or upload information from the traction module, such as diagnostic information, including battery discharge status, which is displayed on battery discharge indicator 192 (see FIG. 4).

Consequently, the system of the present invention the flexibility to integrate modules which are not 8114 otherwise adapted to be connected to the CAN 34 through communication with the CAN modules. This is accomplished by providing the CAN modules (display module 28 and steering module 30 in the preferred embodiment) with the flexibility to send data to a non-CAN module which the CAN module receives over the CAN, and conversely, receive data from a non-CAN module and transmit it over the CAN to other CAN modules.

The memory of the steering module 30 comprises the boot ROM 210, which has the capability of being programmed in-circuit. The ROM 210 has a memory capacity of 8K bytes. The steering module 30 operates out of the boot program memory while reprogrammable memory in RAM is being programmed. After the ROM boot has performed its task, all software execution for the module 30 takes place out of RAM 214. Sections of RAM 214 are available for data, stack and application programs. Flex boot instructions, which will be discussed in greater detail below, will be executed from the data section of RAM. The internal EEPROM 230 contains 512 bytes of electrically erasable memory. This memory is used to store data which does not change often, such as the module identification number and the number of modules in the system 10.

Software Cartridge

As shown in FIG. 6, the software cartridge 44 includes RS 232 connectors 246, 248, for connection to the port 182 on the display module 28 (see FIG. 4) and for connection to a service terminal 46 (see FIG. 3). The cartridge 44 includes a microcontroller or microprocessor 250, such as the Motorola 68HC11E9 microprocessor, which includes internal RAM 252, EEPROM 254, and boot ROM 256. A clock oscillator 258 regulates the operation of the microprocessor 250 and power up and reset circuitry 260 are included to provide a reset condition whenever the voltage supply is under normal operating range. The microprocessor 250, oscillator 258 and power up reset circuitry 260 together comprise the core functional block 262 of the software cartridge 44.

The cartridge 44 also includes a data storage block 264 which includes a flash memory 266 and memory voltage supply 268. The memory 266 is written to and communicates with the microprocessor 250. The memory voltage supply 268 is driven by the microprocessor 250, as well.

The RS 232 connectors 246, 248 are part of an input/output functional block 269, which includes mode selector switching 270 that toggles between a pass through mode, in which the cartridge 44 merely provides a data pathway between the service terminal 46 and display module 28, and a host mode, in which the service terminal is acknowledged, and data is exchanged between the display module 28 and the data storage functional block 264 of the cartridge 44. The input/output functional block 269 includes RS 232 transceivers 271, 272, power supply lines 274, and a service terminal sensing line 276. The service terminal sensing line interconnects the service terminal with the display module 28 to indicate to the display module microprocessor 158 (FIG. 4) that a service terminal is present. If that status exists, the microprocessor 158 sends a signal to the cartridge 44 which is received by the microprocessor 250, instructing the microprocessor to actuate the switching 268 to the pass through mode, which is shown in FIG. 6.

Conversely, if no service terminal 46 is present, the switches comprising selector switch 270 are toggled to connect the microprocessor 250 to the transceiver 271 to provide a data exchange pathway. With the design shown in FIG. 6, it is not necessary to provide the software cartridge 44 with its own power supply; power is received through wires 274 from the display module 28 through the pins of the RS 232 connector 182 (see FIG. 4).

When the cartridge 44 is first powered up, it is configured in the pass through mode, as shown in FIG. 6, and monitors its receive line 278 for an activation code from the microprocessor 158. Upon receipt of the activation code through line 278, the microprocessor actuates the switches 268 to configure the input/output functional block 266 to the host mode. Conversely, to switch the cartridge 44 from the host mode to the pass through mode, a command is sent from the microprocessor 158 of the display module 28 to the microprocessor 250.

In the preferred embodiment, the RS 232 protocol for the software key is simple packet based stop and wait type protocol.

Primitive Boot Power On

Figure 7A:
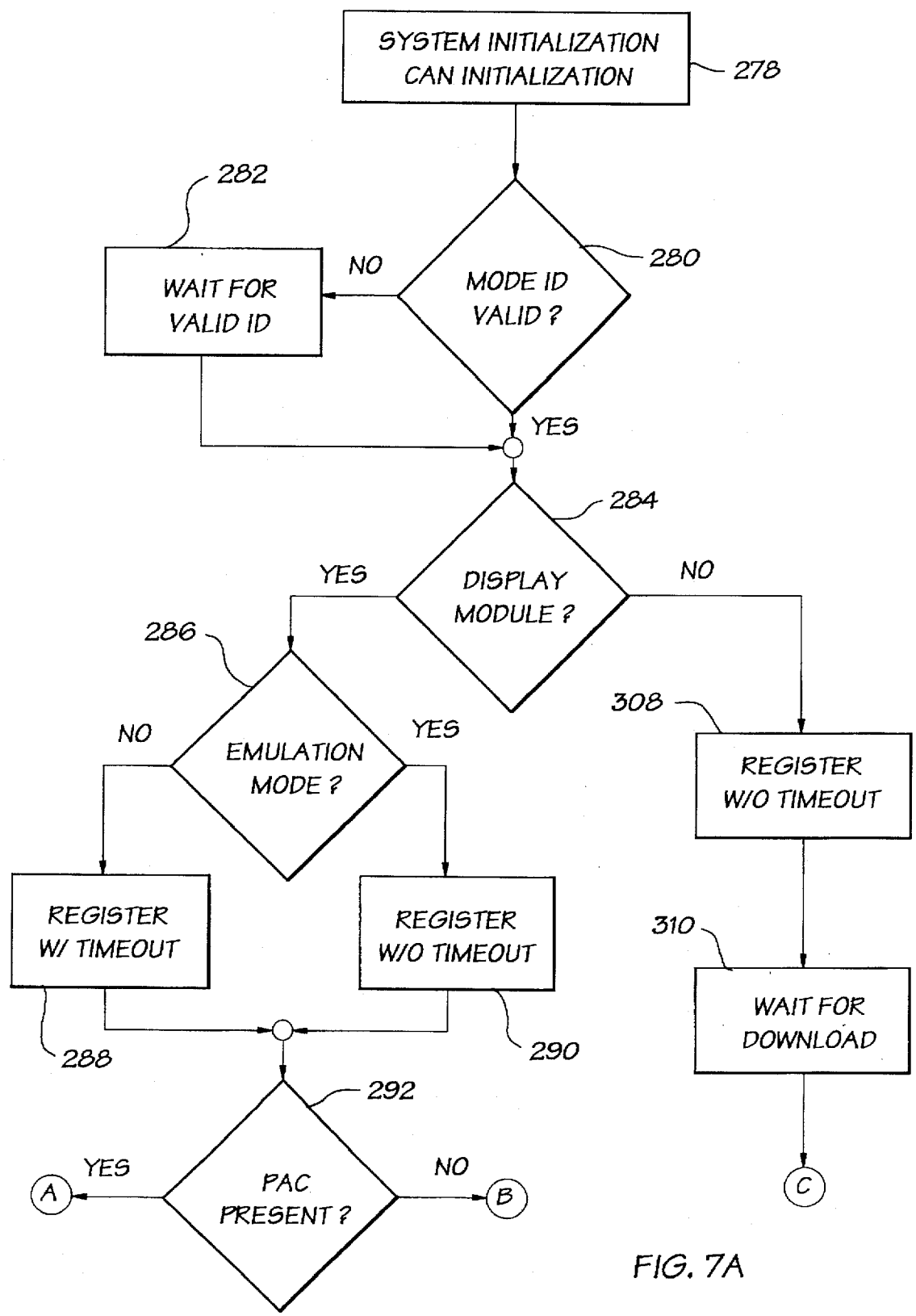
FIGS. 7A and 7B together are a flow chart showing the primitive boot procedure followed by the system of FIG. 2.
Figure 7B:
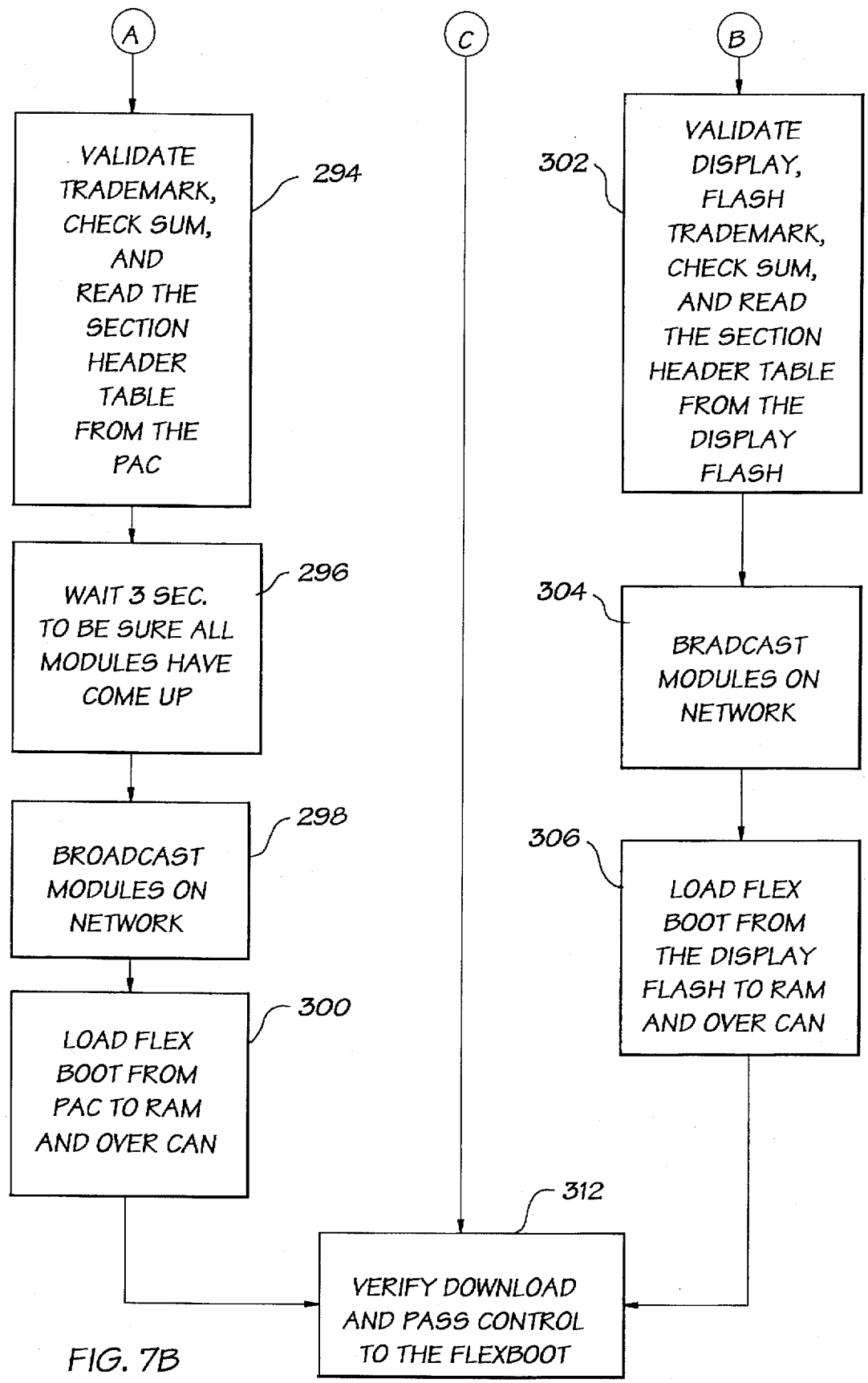

The primitive boot power on is stored in ROM 159, 210 and is activated by system power up. As shown in FIGS. 7A and 7B, upon activation of the key switch 72 (see FIG. 3) the control system 10 begins initialization of the communication network 34, which is shown in box 278 in the flow chart of FIG. 7A. With respect to the display module 28, the primitive boot code shown in the flow chart will run from the ROM 159 internal to the microprocessor 158 to execute the sequence shown. Once initialization has begun, the system checks the module identification data "ID" stored in EEPROM 181 to determine whether the boot program is appropriate for the particular module, as shown in box 280. If the module ID is not appropriate, the system enters a wait state shown in box 282. Once the valid identification data is read, the program determines whether it is running from a display module 28 or not, shown in box 284. If the primitive boot program is loaded from the display module 28, the program then determines whether it is being run in an emulation mode, shown in box 286.

If the primitive boot program is loaded from the display module 28, the registration procedure begins and must be completed in a time out period, shown in box 288. At this time, all modules on the system (which in the case of the preferred embodiment would comprise only steering module 30), which have entered their own primitive boot power on procedures, broadcast their presences and identifying information, such as module identification.

If the system is booting up in an emulation mode, which is used during diagnostics procedures, the initialization procedure conducts a registration without timeout, shown in box 290.

The display module 28 next determines whether a software cartridge 44 is connected to the RS 232 port 182, shown in box 292. As shown in FIG. 7B, if a cartridge 44 is present, the boot program interrogates the cartridge to receive appropriate identifying data, such as a trademark and checksum, which are stored in the flash memory 266 of the data storage block 264 of the cartridge (see FIG. 6). If the information is appropriate, the section header table, stored in flash memory 266, is read, all as shown in box 294.

As shown in box 296, the system now waits an additional three seconds to ensure that all modules in the system have registered and completed their own boot up programs as will be discussed below, and to receive identification data from all modules on the network. As shown in box 298, the display module 28 now broadcasts its own identification data to the other modules on the network.

As shown in box 300, the next step in the initialization process is to load flex boot instructions, stored in flash memory 266 in the cartridge 44, from the cartridge to the RAM 168 in the display module and to steering module RAM 214 over the CAN 34.

Returning to box 292 in FIG. 7A, if a cartridge or PAC 44 is not present, the initialization procedure, as shown in box 302, proceeds to validate the trademark and checksum stored in flash memory 180 of memory functional block 162 of the display module 28, then upon verification, proceeds to read the section header table from the flash memory 180 of the memory functional block 162 to determine what modules should exist on the network, and transmits this information over the CAN 34, as shown in box 304, so that other modules will have the correction information. As shown in box 304, this identification information is broadcast to the other modules on the network. As shown in box 306, at this point, any flex boot instructions for the display module 28 stored in flash memory 180 are transferred to RAM 168, and flex boot instructions for the steering module are broadcast over the network 34, in the event that the flex boot instructions include flex boot instructions for the modules, such as steering module 30.

For the initialization procedure being performed in a non-display module, such as steering module 30, a different process beginning at box 284 in FIG. 7A, takes place. With that process, the registration procedure consisting of broadcasting identification data stored in EEPROM 230 of steering module 30 is broadcast over the network 34 to the display module, and any other modules on the network. This procedure is shown in box 308.

At this time, the steering module 30 enters a wait state until additional instructions are received. As shown in box 310, the steering module 30 receives flex boot instructions, which augment the boot instructions stored in ROM 210, if any such augmented instructions exist, either from the flash 180 or from the flash 266 on the cartridge 44, if the cartridge is connected. Once this downloading has been completed, as shown in box 312 in FIG. 7B, control is passed in the module to the flex boot program.

Flex Boot Power On

Figure 8:
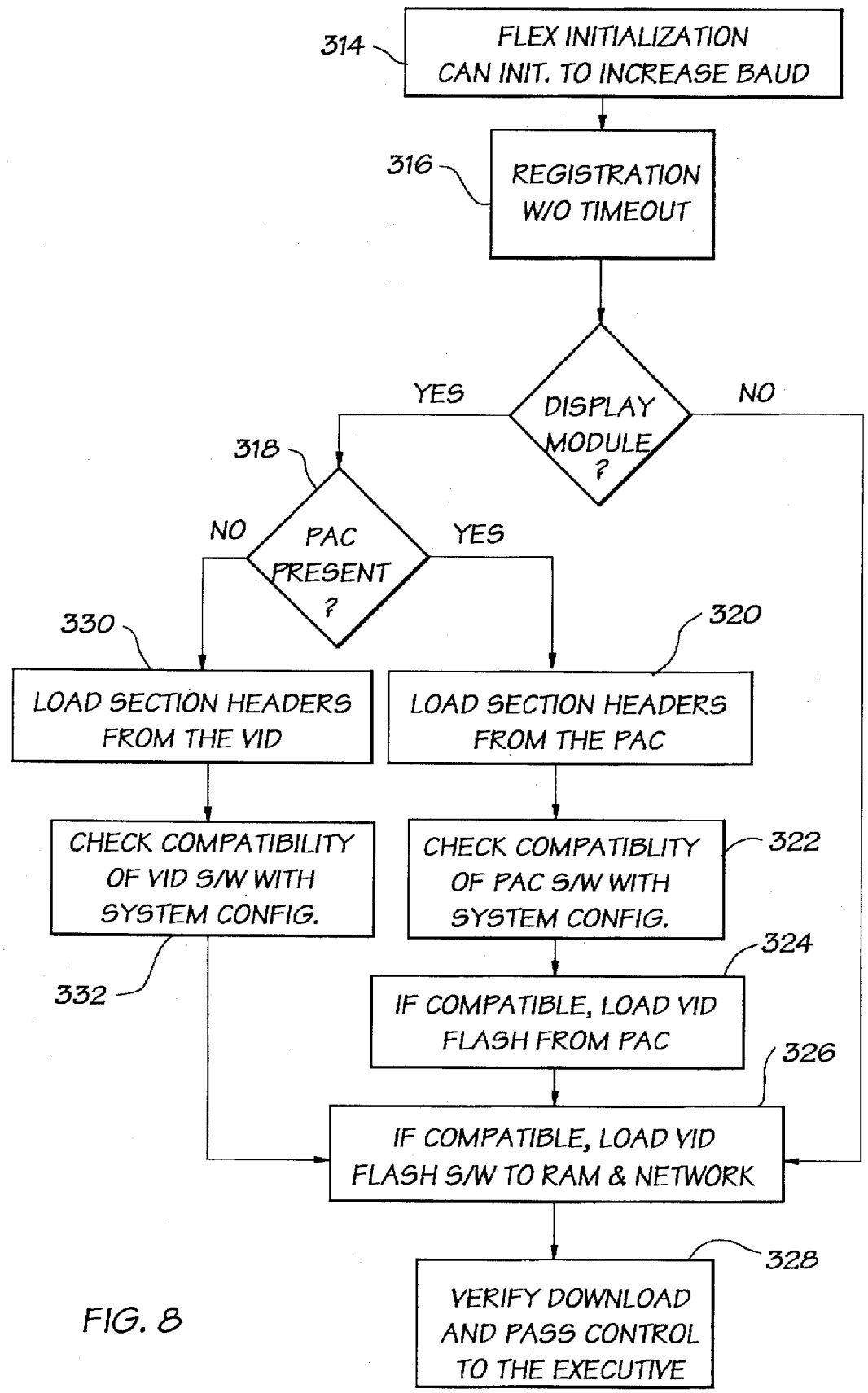
FIG. 8 is a flow chart representing the flex boot procedure of the system of FIG. 2.

As shown in FIG. 8, the flex boot initialization procedure begins at 314 in which the network 34 is instructed to increase the communication baud rate (preferably to 400 k baud). The next step, at 316, is to perform a second registration to ensure that the system is properly configured, and that all modules have identified themselves. If the initialization procedure is occurring within the display module, the next step at 318 is to determine if a cartridge 44 is present. If so, the section headers are loaded from flash memory 266 into the RAM 168 of the display module, as shown at 320.

At this time, as shown at 322, the compatibility of the flex initialization software is verified with respect to the system configuration. If the software is compatible, as shown in 324, the modified instructions are loaded from the cartridge to flash memory 180. Once the modifications have been loaded from the cartridge 44, the modified instructions are loaded from flash memory 180 into RAM 168 and over the network 34 to be loaded into the RAM 214 of the steering module 30. Finally, at 328, the downloading of the instructions are verified and the system begins to execute the stored application software.

Returning to box 318, if a cartridge is not present, the section headers are instead loaded from flash memory 180 to RAM 168, as shown at 330, and as shown at 332, the compatibility of the software with the system configuration (modules, part numbers and truck type) is verified. If compatibility exists, then the instructions are loaded from flash memory 180 to RAM 168 and over the network 34.

In a non-display module, such a steering module 30, the module enters a wait state during which the application software is downloaded from the either the cartridge 44 or flash memory 180 on the display module, and as shown at 328, once downloading of the application software is verified, control passes to the application software.

Software Cartridge Operation Software

Figure 9:
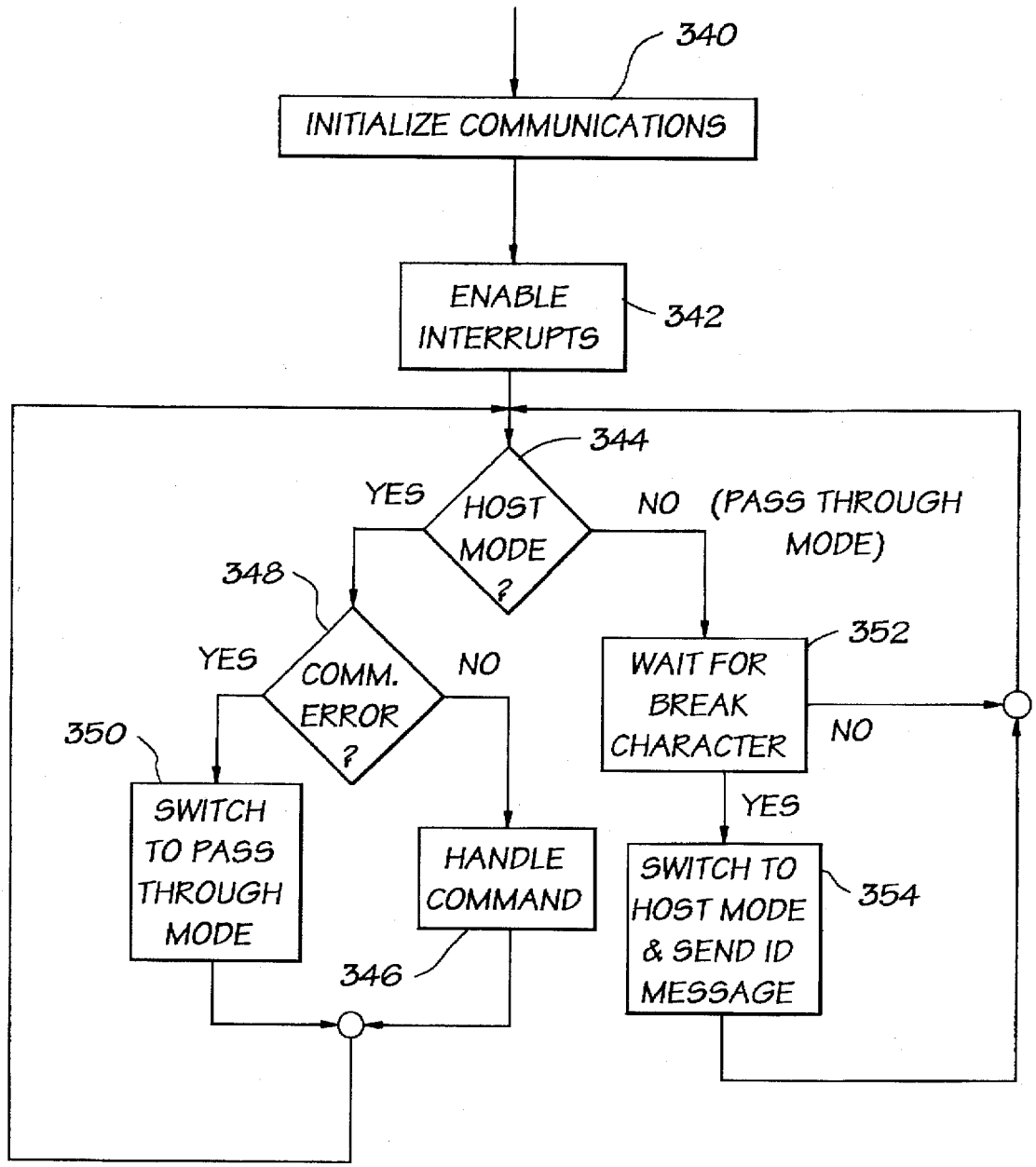
FIG. 9 is a flow chart representing operation of the software cartridge of FIG. 6.

When the software cartridge 44 (see FIG. 6) is connected to the host controller, which in the preferred embodiment is the connection to RS 232 port 182 of microcontroller 158 in the display module 28 (see FIG. 4), power is received from the host controller through lines 274 to power the microcontroller 250. As shown in FIG. 9, the boot process for the software cartridge microcontroller 250, which is stored in boot ROM 256, begins with an initialization of bi-directional communication with the host controller 158, as indicated in box 340. Next, the proper interrupts are enabled to send and receive data from the host controller, indicated by box 342.

The remaining procedure is determined by the state of the cartridge 44: whether it is in the host mode or the pass through mode, as indicated by box 344. If the cartridge 44 is in the host mode, the microcontroller 250 will receive and process commands from the host controller, indicated by box 346. Such commands include commands to download instructions from flash memory 266 to the host controller by the microcontroller 250.

This mode continues until, as indicated by box 348, a communication error is detected by the microcontroller 250. In such an event, as indicated by box 350, the microcontroller 250 actuates selector switch 270 to reconfigure the cartridge 44 to pass through mode. In addition, the host controller can transmit a command which instructs the microcontroller 250 to reconfigure the cartridge 44 to the pass through mode.

In either case, the cartridge 44 remains in the pass though mode until, as indicated by box 352, a break character generated by the host controller is detected by the microcontroller 250 through receive line 278 At that time, the microcontroller 250 reconfigures the cartridge 44 to the host mode by actuating selector switch 270, as shown in box 354. An identification message is sent to the host controller which identifies the cartridge 44 to the host controller.

As described previously, in the preferred embodiment, the cartridge 44 always powers up in the pass through mode, as shown in FIG. 6, and monitors data transmitted from the host controller. Upon detection of the appropriate break character or activation code, the cartridge switches to host mode. Also in the preferred embodiment, the cartridge 44 has its communication rate set to 1200 baud during power up and when in the pass through mode. When switched to the host mode, the baud rate is defaulted to 9600 baud in order to handle the increased amount of data traffic.

As can be seen from the foregoing, the system 10 of the present invention is entirely software configurable and is highly flexible. Application software, which governs the performance of the display and steering modules 28, 30, is stored in flash memory 180 on the display module and is downloaded to the RAM 214 in the steering module and to RAM 168 in the display module, during the power on sequence described with respect to FIG. 8. In the alternative, the application software can be modified by using the software cartridge 44. With cartridge 44, modifications in the application software can be downloaded from flash memory 266 to flash memory 180 and stored, thereby changing the application software which governs the display and steering modules. Such modified software is immediately implement. Subsequent power on procedures will install the modified application software stored in flash 180 of the display module 28.

Further, the cartridge 44 can modify the flex boot procedure discussed with reference to FIG. 8. Again, if the cartridge 44 is present during the primitive boot procedure (see FIGS. 7A and 7B), the boot ROM stored in the display module 28 detects the presence of the cartridge 44 and determines whether modifications to the flex boot program for either the display or steering modules 30 are present. If such instructions are present, they are incorporated into the flex boot procedure performed by the modules. In the alternative, modifications to the flex boot program can be downloaded from the cartridge 44 into flash memory 180 in the display module 28. In such an event, upon initialization of the primitive boot program, the boot ROM programs for both display and steering modules will check the flash memory of the display module to determine whether modifications to the boot program exist there and so, incorporate them into the boot procedure. Thus, the flex boot program can be modified permanently, or in the alternative, modified for a single boot up process which may be necessary for diagnostic purposes.

By making the display and steering modules software configurable, and designing the modules to include a number of general purpose drivers, the steering module—or generically speaking, an application module—can be configured to perform virtually any control function on a lift truck. By utilizing a communication network, information and instructions are shared among various control modules and the information travels over a single pair thereby minimizing the number of cables required between the power unit and operator platform.

While the form of apparatus herein described constitutes a preferred embodiment of the invention, it is to be understood that the invention is not limited to this precise form of apparatus and that changes may be made therein without departing from the scope of the invention.

What is claimed is:

1. A control system for a lift truck comprising:
   a plurality of operation modules residing on said lift truck for controlling operation of a corresponding plurality of lift truck components each of said plurality of operation modules including,
   (a) a random access memory for storing said corresponding application program, and
   (b) a processing circuit for executing said corresponding application program stored in said random access memory and for controlling operation of said corresponding lift truck component according to said execution of said corresponding application program;
   a memory module residing on said lift truck, including a non-volatile memory for storing a plurality of application programs for driving said plurality of operation modules, and including means for connection to an external memory source containing said plurality of application programs; and
   a network for interconnecting said memory module and said plurality of operation modules and for transmitting said plurality of application programs from said non-volatile memory of said memory module to said random access memories of said plurality of operation modules, whereby functioning of said operation modules is varied by replacement of a corresponding one of said application programs in said non-volatile memory of said memory module;
   said memory module transmits said corresponding application program from said non-volatile memory of said memory module to said random access memories of said plurality of operation modules during a boot procedure, whereby the operation of each of said plurality of operation modules can be varied by downloading said plurality of application programs from said external memory source to said non-volatile memory of said memory module.

2. The control system of claim 1, wherein said external memory source is a removable memory cartridge.

3. The control system of claim 2 wherein one of said operation modules is a display module for displaying information regarding said lift truck to an operator thereof.

4. The control system of claim 3 wherein each of said operation modules include a nonvolatile memory for storing identification data particular to said operation module.

5. The control system of claim 4 wherein each of said operation modules includes an associated boot memory containing resident boot instructions requiring each of said operation modules to interrogate the other of said operation modules to receive said identification data over said network as a prerequisite to at least one of said operation modules entering an operating mode.

6. The control system of claim 5 wherein said resident boot instructions actuate its associated operation module to receive its corresponding application program from said non-volatile memory of said memory module as a part of said boot procedure.

7. The control system of claim 6 wherein said memory cartridge contains advanced boot instructions, whereby said plurality of application programs and said advanced boot instructions can be downloaded to said non-volatile memory of said memory module from said memory cartridge through said connection means.

8. The control system of claim 7 wherein said memory module includes identification data relating to a specific associated vehicle; and said memory cartridge includes means for reading said vehicle identification data from said memory module and downloading said plurality of application programs and said advanced boot instructions only if said vehicle identification data matches data stored on said memory cartridge.

9. The control system of claim 7 wherein of said modules includes instructions in said associated boot said resident boot instructions actuate means for interrogating said memory cartridge, when said memory cartridge is connected to said system, to receive said advanced boot instructions from said memory cartridge.

10. The control system of claim 1 wherein each of said operation modules include a switch input driver coupled to said corresponding lift truck component and monitored by said processing circuit, and an output driver coupled to said corresponding lift truck component and actuated by said processing circuit, for facilitating in the controlling of said corresponding lift truck component.

11. The control system of claim 10 wherein one of said plurality of operation modules comprises a steering module which includes a bridge driver for actuating a steering bridge.

12. The control system of claim 3 wherein said display module includes means for indicating a state of a selected component of said associated lift truck to an operator thereof, and a driver, actuated by said processing circuit, for actuating said indicating means.

13. The control system of claim 12 wherein said display module includes said memory module.

14. The control system of claim 1 wherein said non-volatile memory for storing said plurality of application programs is a flash memory.

15. For use in a lift truck of a type including a plurality of operation modules and a memory module residing on said lift truck, each of said operating modules having first non-volatile memory for storing identification data identifying said operation module and for storing a resident boot program, and each of said operating modules also having a random access memory, said memory module including a non-volatile memory for storing a plurality of operation application programs, each of said application programs having instructions for controlling a corresponding one of said plurality of operating modules, said plurality of operation modules and said memory module being interconnected by a distributed network, a method of identifying and configuring said plurality of operation modules comprising the steps of:

initiating said resident boot program;

verifying that said identification data is valid and, if said identification data is valid, continuing with said method; and loading each of said application programs from said non-volatile memory of said memory module to a random access memory associated with a corresponding one of said operation modules such that said operation modules are configured according to said instructions of said corresponding application programs.

16. The method of claim 15 wherein said memory module includes advanced boot instructions, and said method further comprises the step of broadcasting said advanced boot instructions to said random access memories associated with said operation modules.

17. The method of claim 16 further comprising the step of transmitting said plurality of application programs and said advanced boot instructions to said non-volatile memory of said memory module from a removable memory cartridge.

18. The method of claim 15 further comprising the step of transmitting advanced boot instructions to said random access memories associated with said operation modules from a removable memory cartridge.

19. The method of claim 17 further comprising the step of verifying identity of said memory cartridge prior to said transmitting step.

20. The method of claim 18 further comprising the step of verifying identity of said memory cartridge prior to said transmitting step.

21. The method of claim 15 further comprising the step of determining compatibility of each of said operation application programs stored in said non-volatile memory of said memory module with said corresponding operation module; and continuing with said method only if said instructions are compatible with said corresponding operation module.

22. The method of claim 21 wherein said loading step includes the step of transmitting each of said application programs from said non-volatile memory of said memory module over said distributed network to said random access memory associated with said corresponding one of said operation modules.

23. The method of claim 22 further comprising the step of verifying said transmission of each of said application programs to said random access memory associated with said corresponding one of said operation modules.

24. The method of claim 23 further comprising the step of passing control of each of said operation modules from said resident boot program to said corresponding application program.

* * * * *